(12) United States Patent
Maher

(10) Patent No.: US 6,415,807 B1
(45) Date of Patent: Jul. 9, 2002

(54) DECOY HUNTING/OBSERVING BLIND

(76) Inventor: Patrick D. Maher, 4740 North Mesa Dr., Castle Rock, CO (US) 80104

( * ) Notice: Subject to any disclaimer, the term of this patent is extended or adjusted under 35 U.S.C. 154(b) by 0 days.

(21) Appl. No.: 09/644,775

(22) Filed: Aug. 23, 2000

(51) Int. Cl.[7] ............................................. E04H 15/00
(52) U.S. Cl. ..................... 135/901; 43/1; 43/2
(58) Field of Search ................. 135/901, 99; 43/1–3

(56) References Cited

U.S. PATENT DOCUMENTS

| 4,067,346 A | | 1/1978 | Husted |
| 4,086,931 A | | 5/1978 | Hall |
| 4,110,941 A | | 9/1978 | Scott |
| 4,375,488 A | | 3/1983 | Hogan |
| 4,581,837 A | * | 4/1986 | Powlus ........................... 43/1 |
| 4,689,913 A | | 9/1987 | Brice |
| 4,723,371 A | | 2/1988 | Williams |
| 4,738,045 A | | 4/1988 | Cardozo |
| 4,794,717 A | * | 1/1989 | Horsmann ....................... 43/1 |
| 4,829,694 A | * | 5/1989 | Oasheim ......................... 43/1 |
| 5,458,079 A | | 10/1995 | Matthews et al. |
| 5,675,926 A | * | 10/1997 | Manka ........................ 135/901 |
| 5,678,346 A | | 10/1997 | Kellett |
| 5,720,312 A | * | 2/1998 | Scheuermann .............. 135/901 |
| 5,787,632 A | | 8/1998 | Kraut |
| 6,016,823 A | * | 1/2000 | Hill ............................. 135/901 |
| 6,138,396 A | * | 10/2000 | Capps ............................. 43/3 |

* cited by examiner

Primary Examiner—Beth A. Stephan
(74) Attorney, Agent, or Firm—John E. Reilly

(57) ABSTRACT

A blind for hunters or observers and particularly geese hunters is characterized by having a decoy shell in the form of a goose which is sized to be large enough to accommodate the hunter or observer in a seated position on a swivel mount and to cover the greater portion of the hunter so as to be concealed from view, and the decoy is divided into symmetrical halves which are pivotal about a shell support structure at the base of the shell so as to be readily movable into an open position when the hunter wishes to fire at approaching geese.

19 Claims, 5 Drawing Sheets

DECOY HUNTING/OBSERVING BLIND

BACKGROUND AND FIELD OF INVENTION

This invention relates to a hunting blind and more particularly relates to a novel and improved blind adapted for hunting or observing fowl.

Various types of hunting blinds have been devised for hunting fowl, particularly ducks and wild geese, and these can generally be characterized as being portable and in many cases shaped to simulate a bird, such as, a wild goose. Representative examples are U.S. Pat. No. 4,067,346 to Husted, G. L., U.S. Pat. No. 4,086,931 to Hall, W. E., U.S. Pat. No. 4,110,941 to Scott, R. K., U.S. Pat. No. 4,375,488 to Hogan, M. J., U.S. Pat. No. 4,689,913 to Brice, R. V., U.S. Pat. No. 4,723,371 to Williams, D. C., U.S. Pat. No. 4,738,045 to Cardozo, D. W., U.S. Pat. No. 5,458,079 to Matthews, G. et al, U.S. Pat. No. 5,592,960 to Williams, C. R., U.S. Pat. No. 5,678,346 to Kellett, K. C., and U.S. Pat. No. 5,787,632 to Kraut, R.

The art of designing blinds has been extremely active and crowded over the years. Nevertheless, there is a continuing need for a hunter's blind which is in the form of a decoy but is sufficiently large that the hunter can sit or stand comfortably within the decoy with virtually unlimited viewing. In this respect, it is important that the hunter be able to selectively open the shell or decoy quickly and be in a position to immediately fire a gun.

SUMMARY OF THE INVENTION

It is therefore an object of the present invention to provide for a novel and improved blind which is sized to permit a hunter or observer to sit or stand comfortably therein and wherein the blind has an appearance simulating that of a goose or other fowl and can be rapidly opened by the hunter when birds approach the blind.

It is another object of the present invention to provide for a novel and improved blind which can be easily assembled and disassembled in a minimum number of steps and in assembled position will form a housing which covers the greater part of the hunter's body.

It is a further object of the present invention to provide for a novel and improved blind which will attract approaching geese and at the same time cover the hunter's body; and further wherein the blind is so constructed and arranged that it can be swivelled to afford an unrestricted view of approaching fowl, is readily movable into an open position when the hunter wishes to fire at the approaching fowl and can be readily disassembled without the necessity of removing fasteners or other attachment devices.

In accordance with the present invention, it has been found that, for purposes of attracting geese, the size of a decoy is of little or no importance. Rather, the shape and appearance of the decoy are major factors in attracting geese and that it be formed in such a way as to substantially completely conceal the hunter stationed in the blind; yet, make it as comfortable as possible for the hunter who must wait over extended time periods before sighting the approaching geese. Still another desirable feature is that the blind be as lightweight as possible, readily transportable and stowable when not in use.

In accordance with the present invention, a hunter's blind has been devised which comprises a housing in the form of a hollow shell of generally oval-shaped configuration having segmental wall portions movable between a closed position in which the segmental wall portions define a substantially continuous wall and an open position in which said segmental wall portions are movable laterally and outwardly to form an upper opening large enough for the hunter to protrude and fire a gun at approaching fowl; and opposite sides of the shell terminate in a lower annular edge, a seat mounted for upward extension from a support structure into the housing, the housing being sized to accommodate a hunter in a seated position therein, and housing-support means for mounting the housing above ground level so that a hunter can be positioned comfortably within the housing and be able to sight approaching fowl or game. In the preferred form of hunter's blind, the seat mounting means is adapted to mount the seat for rotation about a vertical axis and the shell or housing is rotatable with the seat to enable the hunter to periodically rotate the blind to view or sight over substantially 360° or a full circle. The shell is configured to be in the form of a fowl with an upper recessed portion for the head of the hunter and a viewing aperture through the upper recessed portion; and the segmental portions of the shell can be readily opened and closed by the hunter by hinging about lower pivotal support means between the lower end of the shell and the shell support means. The segmental portions are preferably symmetrical halves in normally closed relation to one another but which will open laterally outwardly about the lower hinges to permit the hunter to rapidly aim and fire his gun.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENT

Figure 1:
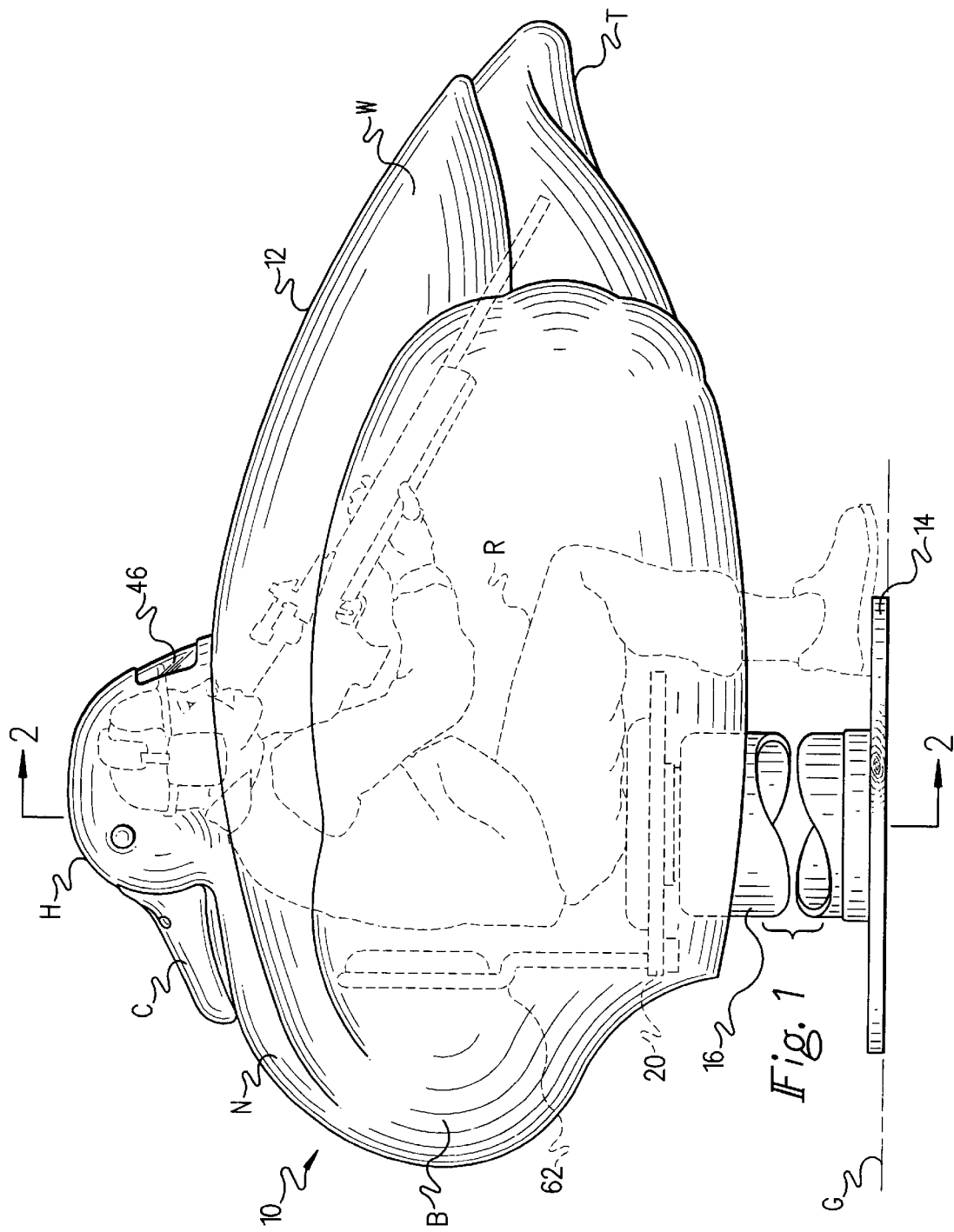
FIG. 1 is a side view in elevation of a preferred form of invention illustrating a hunter in silhouette form seated within the blind.

Referring in more detail to the drawings, there is illustrated in FIGS. 1 to 6 a preferred form of blind 10 which is broadly comprised of a housing 12 mounted above ground level G by a base support 14 with pedestal 16 off-set somewhat toward the front end of the shell and housing-support structure generally designated at 18. The housing support structure is made up of a circular panel 20 which is rotatably mounted on the pedestal 16 by a bearing assembly 22 and affixed to the pedestal by a central fastener, such as, a bolt 24 and nut 25. The housing-support structure 18 further includes arms 28 at diametrically opposed locations on the panel 20, each having a lower end 30 extending downwardly through a slot 32 in the panel and arranged in a diagonal position against a reinforcing block 34. The upper end of each arm 28 includes pivotal support means in the form of a hinge 36, one side of the hinge secured to the arm 28 and the other side secured to a reinforcing block 40 which is affixed to the inner wall surface of the housing 12 at a point approximately one-third of the way up the side wall, but it will be apparent that the hinge point may be varied. Moreover, if desired, the hinge point may be placed between the lower end 30 and the panel but will be more difficult to disassemble.

An important feature of the present invention resides in the configuration of the housing 12 which is in the form of a hollow decoy having segmental wall portions 42 and 42'. In the preferred form the wall portions 42 and 42' are symmetrical halves which will assume a normally closed relationship to one another, as shown in full in FIG. 2, with a common parting line 44 therebetween extending lengthwise of the shell. As alluded to earlier, each half 42, 42' may be further divided into two or more segmental wall portions which would be individually hinged and pivotal about the hinges between open and closed positions. Preferably, the shell is molded in halves and, which when assembled, will simulate a goose. Thus, the exterior of the shell includes an upper neck N curving upwardly from a breast portion B and terminating in a recessed portion defining the head H with a beak C. The side walls of the halves 42 and 42' are further simulated to form a tail portion T and wings W and may be painted with appropriate colors to simulate the appearance of a goose. The upper recessed or head portion includes a vertical wall section H' with a viewing aperture 46 therein which is at the eye level of the hunter. Each of the halves 42 and 42' diverge downwardly, then verge into more nearly vertical wall portions 52 and at their lower edges converge as at 54 and terminate in lower annular edges 55. In this relation, the shell is sized to accommodate a hunter or observer, shown in dotted form at R in FIG. 1, in a seated position on the support panel 20 such that the head of the hunter is in the recessed portion H of the shell and the viewing aperture 46 is approximately at eye level. For this purpose, a suitable cushion or padding 60 may be positioned on the support panel and, as shown in FIG. 1, a back rest 62 may be mounted to extend upwardly from one edge of the support panel 20.

Figure 2:
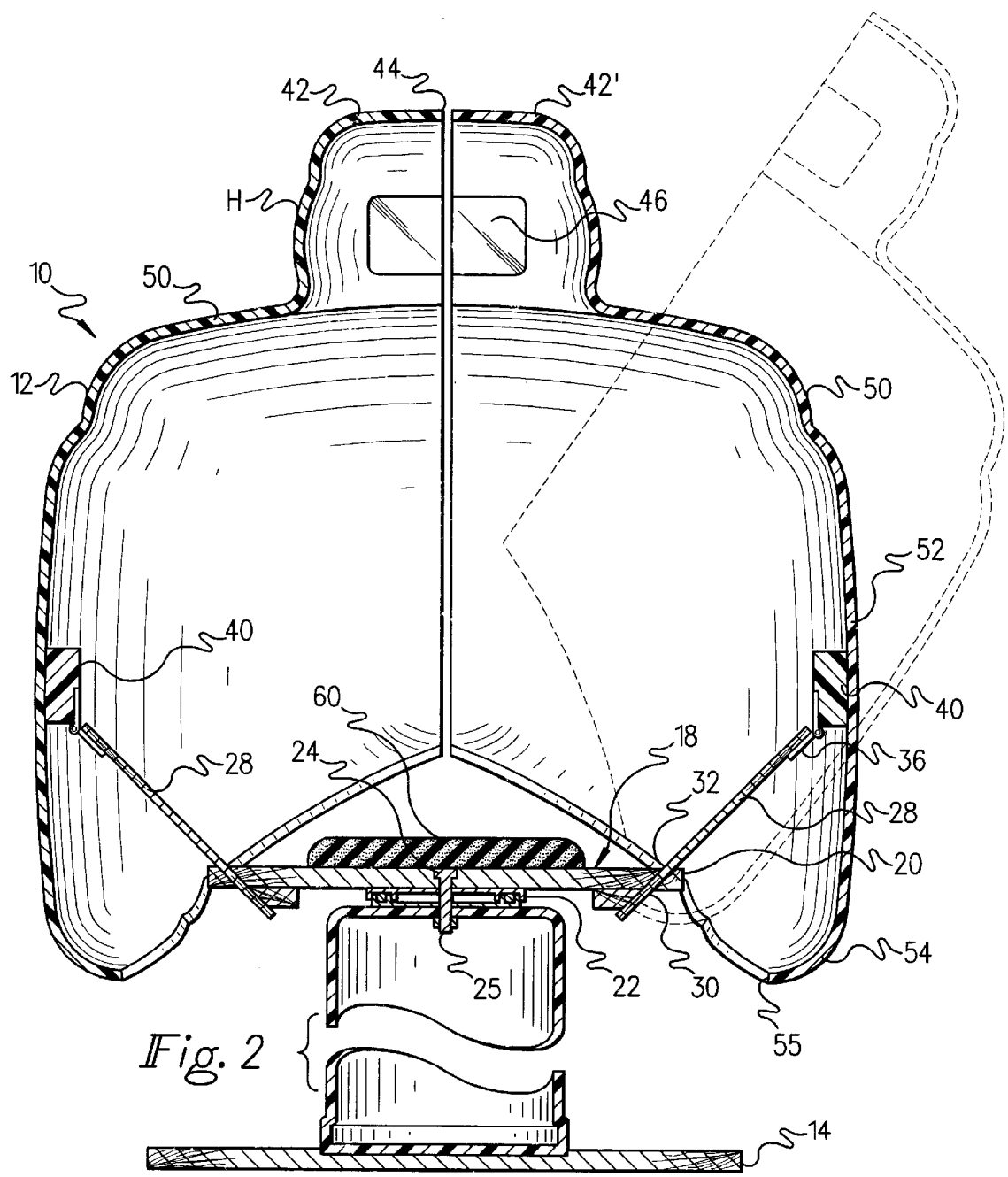
FIG. 2 is a cross-sectional view taken about lines 2—2 FIG. 1.
Figure 3:
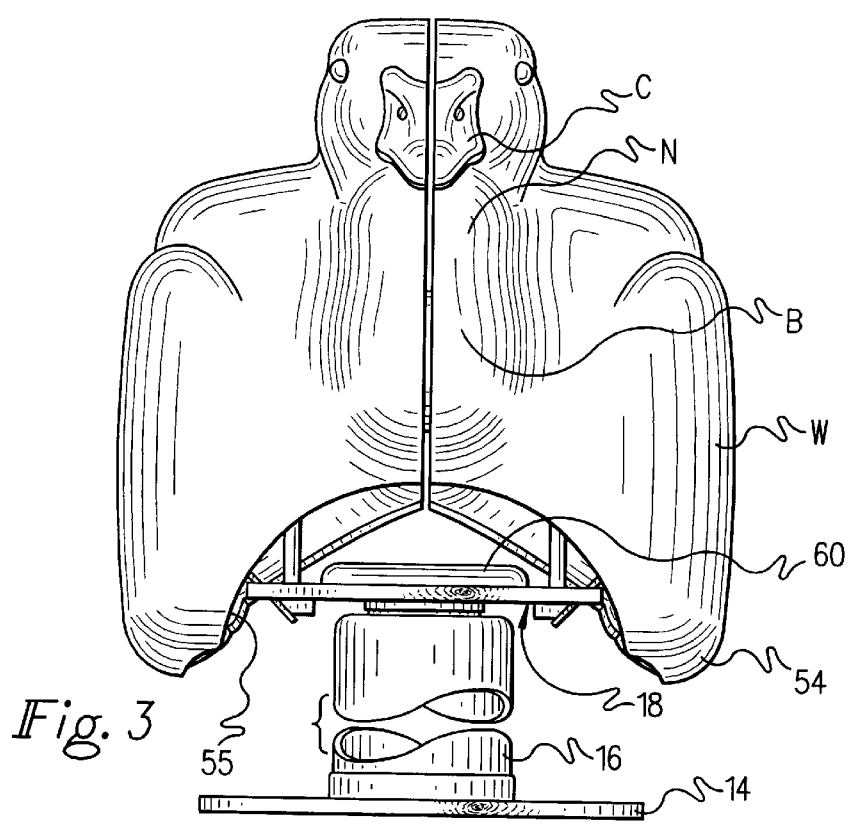
FIG. 3 is an end view of the preferred form of blind from the front end of the decoy.
Figure 4:
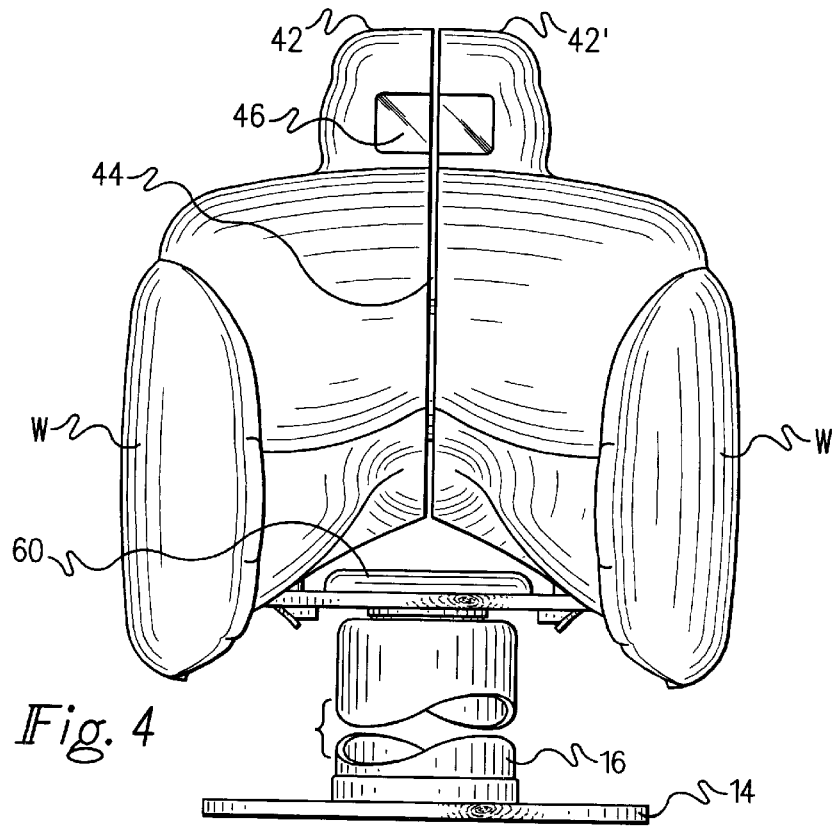
FIG. 4 is a rear end view taken from the tail end of the decoy.
Figure 5:
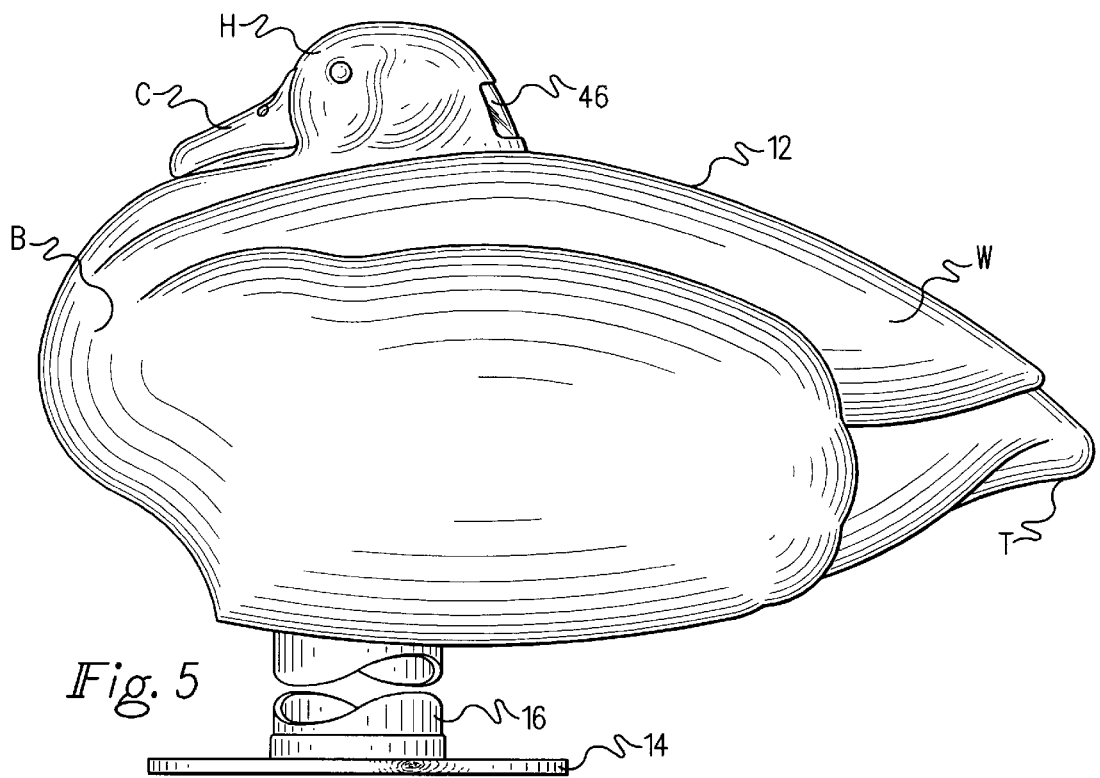
FIG. 5 is a side view in elevation of the preferred form of blind.
Figure 6:
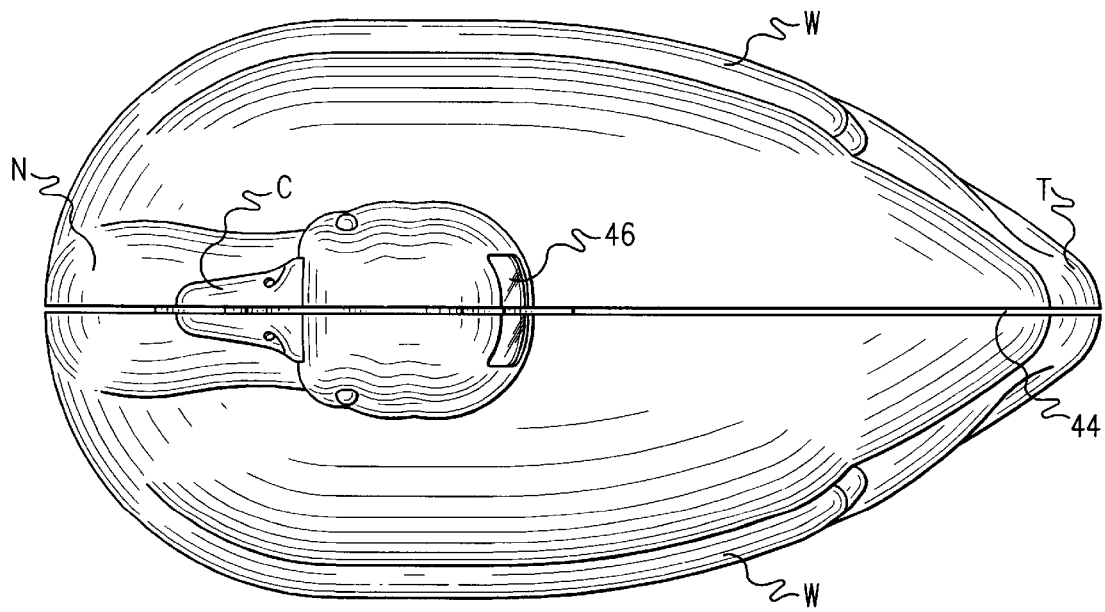
FIG. 6 is a top plan view of the preferred form of blind.
Figure 7:
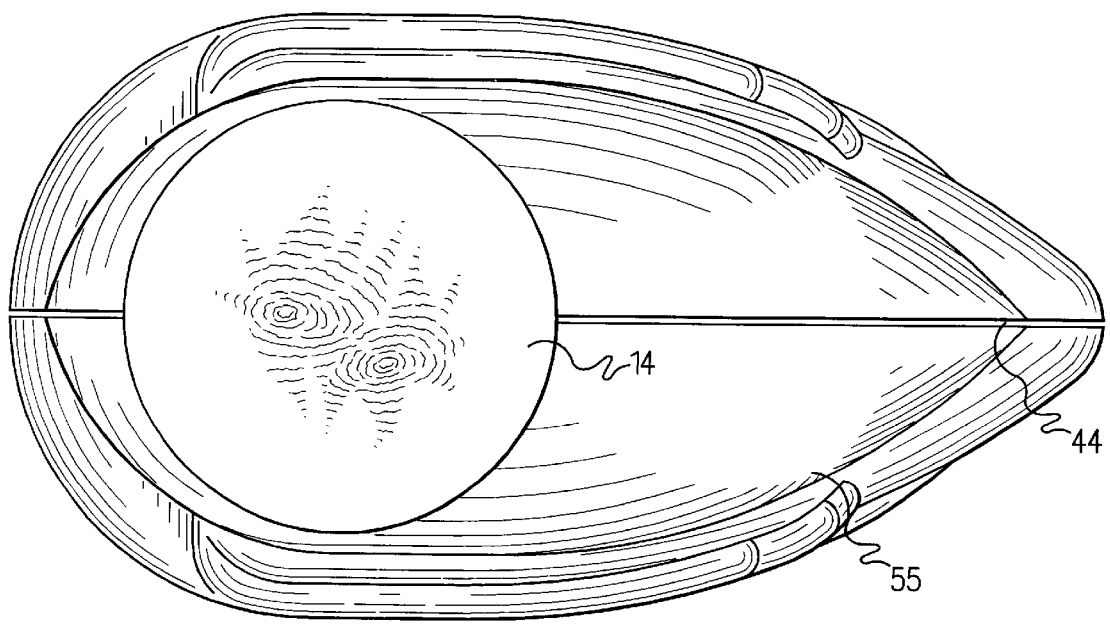
FIG. 7 is a bottom plan view of the preferred form of blind in accordance with the present invention.

Again, the shell itself is sized such that when the halves 42 and 42' are opened by swinging outwardly about the hinges 36 to the dotted line position shown in FIG. 2, the hunter or observer R simply may step inside between the open halves, assume a seated position and then return the shells to their closed position. Thus, the lower annular edge 55 affords sufficient clearance not only to permit outward swinging movement of the halves into a diagonal position as shown but also to afford sufficient clearance for the hunter's legs and feet in the closed position.

Considering in more detail the mounting and construction of the decoy housing 10, the pedestal 16 is preferably a hollow cylindrical post which will afford a broad enough base support for the bearing assembly 22 and housing support 18 as well as seat portion 60. It will be apparent that the pedestal may be made of telescoping members which will permit adjustment of the height of the seat portion 60 according to the size and individual preference of the hunter. It is conceivable, also, that the hunter may prefer to stand within the shelter and not require a seat portion and thus the hunter can assume either a seated or standing position if desired. From a practical standpoint, however, it is generally preferable to maintain the decoy at a relatively low level or height. It will be further apparent that the decoy may be of different configurations according to the type of game being hunted or observed and, for example, may be in the configuration of a duck. The central support panel 20 and arms 28 may be of wood, plastic or metal construction or other suitable material, and the same is true of the reinforcing blocks 34 and 40. The hollow shell is preferably molded out of conventional plastic or fiberglass materials and is of thin-walled construction to make it as lightweight as possible. In this respect, the preferred form of blind can be easily assembled by detaching one of the hinge leaves of each halve and effectively separate into three parts, namely, the two halves and the housing support structure. In this way, the blind can be easily transported to different sites and stowed away in a relatively small area when not in use.

It is therefore to be understood that while a preferred form of invention is herein set forth and described, the above and other modifications and changes may be made in the construction and arrangement of parts without departing from the spirit and scope thereof as defined by the appended claims.

I claim:

1. A blind comprising in combination:
   a housing in the form of a hollow shell, said shell having segmental wall portions, and opposite sides of said shell terminating at a lower annular edge, said shell being sized to accommodate a hunter or observer in an upright position therein; said shell is a decoy having an external appearance simulating a fowl being hunted or observed; and shell-supporting means extending upwardly from ground level through said lower annular edge of said shell for mounting said shell above ground level.

2. A blind according to claim 1 wherein a rotatable seat is mounted on said shell-supporting means.

3. A blind according to claim 1 wherein said shell-supporting means is operative to mount said shell for horizontal rotation about a vertical axis.

4. A blind comprising in combination:
   a shell having an external appearance simulating a fowl being hunted or observed, shell-supporting means extending upwardly from ground level, through a lower portion of said shell for mounting said shell above ground level, a seat in said lower portion, and said shell-supporting means being operative to mount said shell for horizontal rotation about a vertical axis through said seat.

5. A blind comprising in combination:
   a housing in the form of a hollow shell, said shell having segmental wall portions in normally closed relation to one another, and opposite sides of said shell terminating in a lower annular edge;

a seat including means for mounting said seat within said housing, said shell being sized to accommodate a hunter or observer in a seated position;

said mounting means for said seat includes a ground engaging base member and an upwardly extending pedestal upon which said seat is mounted; and shell-supporting means for mounting said shell above ground level in surrounding relation to said seat whereby a hunter or observer can be positioned in an upright seated position on said seat within said shell.

6. A blind according to claim 5 wherein said mounting means is adapted to mount said seat for horizontal rotation of said seat about a vertical axis.

7. A blind according to claim 6 wherein said shell is horizontally rotatable with said seat.

8. A blind according to claim 5 wherein said shell is configured to be in the form of a fowl having an upper viewing aperture therein.

9. A blind according to claim 8 wherein said viewing aperture is in an upper extremity of said shell.

10. A blind according to claim 5 wherein said segmental wall portions define symmetrical halves on said opposite sides of said shell.

11. A blind according to claim 10 wherein said shell-supporting means includes pivotal supporting means for pivotally supporting said halves for movement between closed and open positions.

12. A blind according to claim 11 wherein said halves of said shell converge downwardly from opposite sides into said lower annular edge.

13. A blind according to claim 10 wherein said support means includes brace members between said seat and said halves, and hinge members pivotally mounting said halves with respect to said brace members.

14. A blind comprising in combination:

a housing in the form of a hollow shell of oval-shaped configuration, said shell having symmetrical halves in normally closed relation to one another, and opposite sides of said shell converging downwardly and terminating in a lower annular edge;

a seat including means for mounting said seat for rotation about a vertical axis extending upwardly within said housing, said shell being sized to accommodate a hunter therein with said annular edge spaced above ground level; and shell-supporting means for mounting said shell above ground level in surrounding relation to said seat whereby a hunter can be positioned in an upright position within said shell.

15. A blind according to claim 14 wherein said shell is rotatable with said seat.

16. A blind according to claim 14 wherein said shell is configured to be in the form of a fowl having an upper viewing aperture therein, and said viewing aperture is in an upper extremity of said shell.

17. A blind according to claim 16 wherein said upper extremity of said shell is sized for insertion of the head of a hunter with said viewing aperture at eye level.

18. A blind according to claim 14 wherein said shell-supporting means includes pivotal support means for pivotally supporting said halves for movement between closed and open positions.

19. A blind according to claim 18 wherein said halves of said shell converge downwardly from opposite sides into said lower annular edge, and said pivotal support means is defined by a hinge pivotally attached to an inner surface of each of said halves in spaced relation to and above said lower annular edge.

* * * * *